United States Patent
Sheehan

[19]

[11] Patent Number: 6,112,423
[45] Date of Patent: Sep. 5, 2000

[54] APPARATUS AND METHOD FOR CALIBRATING A PROBE ASSEMBLY OF A MEASURING MACHINE

[75] Inventor: Kenneth L. Sheehan, Saunderstown, R.I.

[73] Assignee: Brown & Sharpe Manufacturing Co., North Kingstown, R.I.

[21] Appl. No.: 09/231,148

[22] Filed: Jan. 15, 1999

[51] Int. Cl.[7] .................................................. G01C 25/00
[52] U.S. Cl. ................................ 33/502; 33/503; 73/1.01
[58] Field of Search ............................... 33/502, 503, 555, 33/556, 558, 559, 561; 73/1.01

[56] References Cited

U.S. PATENT DOCUMENTS

| | | |
|---|---|---|
| 3,986,109 | 10/1976 | Podiue . |
| 4,523,450 | 6/1985 | Herzog ........................................ 33/502 |
| 4,866,643 | 9/1989 | Dutler ........................................ 33/504 |
| 4,884,889 | 12/1989 | Beckwith, Jr. . |
| 4,939,678 | 7/1990 | Beckwith, Jr. . |
| 5,189,806 | 3/1993 | McMurtry et al. ........................ 33/503 |
| 5,245,759 | 9/1993 | Pearson . |
| 5,248,933 | 9/1993 | Venditti . |
| 5,283,630 | 2/1994 | Yoshizumi . |
| 5,412,880 | 5/1995 | Raab .......................................... 33/503 |
| 5,583,443 | 12/1996 | McMurtry et al. . |
| 5,649,368 | 7/1997 | Herzog et al. . |
| 5,665,896 | 9/1997 | McMurtry ................................. 73/1.75 |
| 5,714,674 | 2/1998 | Tsukuda et al. ........................... 33/502 |
| 5,813,128 | 9/1998 | Bailey ........................................ 33/502 |

*Primary Examiner*—Christopher W. Fulton
*Attorney, Agent, or Firm*—Wolf, Greenfield & Sacks, P.C.

[57] ABSTRACT

A precision measuring machine, such as a coordinate measuring machine, includes a probe assembly fixed to a movable member of the machine. The probe assembly includes a probe tip. A calibration object is detachably secured to the movable member in fixed relation to the probe assembly. The probe assembly articulates into a position such that the calibration object may be probed by the probe tip to recalibrate the probe assembly.

56 Claims, 8 Drawing Sheets

APPARATUS AND METHOD FOR CALIBRATING A PROBE ASSEMBLY OF A MEASURING MACHINE

BACKGROUND OF THE INVENTION

1. Field of the Invention

This invention relates generally to precision measuring machines such as coordinate measuring machines and, more specifically, to apparatuses and methods for calibrating measuring probes on such machines.

2. Related Art

Precision measuring machines, such as coordinate measuring machines, are commonly used for dimensional inspection of workpieces such as machine parts. Typically, a workpiece to be measured is secured to a fixed table, and a measuring probe is secured to a component of the machine, which is movable along three coordinate axes. To measure the position of a point on a workpiece, the probe is brought into proximity with the point and the x, y and z coordinates of the probe position are recorded.

Typical configurations of coordinate measuring machines include bridge-type machines and horizontal arm machines. In bridge-type machines, a bridge is supported by, and movable along, y-axis guideways; the bridge supports a carriage which is movable in the x-axis direction; the carriage supports a vertical component of the machine, commonly referred to as a ram, which is movable in the z-axis. The probe assembly is attached to the lower end of the ram. In a horizontal arm machine, a horizontal arm to which a probe assembly is attached is supported by a z-axis carriage movable on a z-axis rail; the z-axis rail is deflected from vertical depending on both the position of the carriage and the distance by which the arm is extended. Some state of the art coordinate measuring machines have refinements such as rotatable probe assemblies, which are rotatable about two independent axes of rotation. Other refinements include the use of capacitance and laser probes, for example.

The accuracy of conventional coordinate measuring machines is limited by inaccuracies in the calibration of its measuring probe. Over time, the probe calibration degrades due to a well known phenomenon commonly referred to as calibration drift, which may be caused by many mechanical or environmental factors. For example, heat generation can cause rapid calibration drift and subsequent degradation in measurement accuracy in certain probes such as capacitance and laser probes. One approach to improve the accuracy in such machines is to design probe assemblies which minimize heat generation, heat build-up, or dimensional instability caused by heat effects. This approach, however, can be technically challenging and expensive to implement.

Alternatively, probes can be more frequently calibrated to minimize the effects of calibration drift on measurement accuracy. Current technology in common usage for probe calibration utilizes a calibration object for both the initial calibration and for periodic recalibration. In typical arrangements, the calibration object is attached to the worktable at a fixed location in the measurement volume. Calibration drift is detected by returning the probe to the fixed location of the calibration object and making measurements of coordinate positions on the calibration object.

Many disadvantages with these conventional calibration strategies exist. For example, one disadvantage is the lost time required to move the probe to the fixed location at which the calibration object is located. This lost time results in an increase in the overall time required to measure objects. In addition, because the calibration object is fixed in the measurement volume, the effective area available for the workpiece is reduced. In some instances, the calibration object is removed from the measurement volume. Thus, an additional drawback with a conventional calibration strategy is the time associated with the periodic reinstallation of the calibration object.

SUMMARY OF THE INVENTION

The present invention is a calibration system that overcomes the above and other disadvantages of conventional calibration techniques. The present invention is a calibration object fixed relative to a probe assembly and accessible to a probe tip of the assembly providing for the immediate performance of probe tip calibration procedures without having to reposition the probe assembly to a specified location within the measurement volume. This significantly reduces the time associated with such calibration procedures, thereby reducing operating costs. Further, the available measurement volume is increased.

In one particular aspect of the invention, a measuring machine is disclosed. The machine includes a frame, a probe assembly having a probe tip, movably coupled to the frame and a calibration object coupled to the frame in fixed relation to the probe assembly so as to move with the probe assembly. The calibration object is adapted to be probed by the probe tip for calibrating the probe assembly.

In another aspect of the invention, the measuring machine includes a frame defining a measurement volume and a movable member movably attached to the frame. A probe assembly, having a probe tip, is attached to the movable member for probing measurements of a workpiece placed in the measurement volume. The machine further includes a calibration object detachably secured to the movable member in fixed relation to the probe assembly. The calibration object is adapted to be probed by the probe tip for calibrating the probe assembly.

In yet another aspect of the invention, the machine includes a computer, which causes the machine to enter a recalibration mode based on a sensed condition. The sensed condition may be at least one of temperature, humidity, time or operator invocation. Alternatively, the sensed condition is based on a comparison of a discrepancy and a first predetermined threshold. The discrepancy is defined as a difference between a probed measurement and a desired measurement.

In one embodiment, the computer causes the probe tip to probe the calibration object after probing a fixed calibration object and before probing the workpiece.

In another embodiment, the computer develops an error matrix corresponding to the calibration object for use in recalibrating the probe assembly.

In still another aspect of the invention, a calibration surface for calibrating a probe assembly of a measuring machine is disclosed. A probe assembly is mounted on a movable arm of the machine and includes a probe tip. The calibration surface is positioned on the movable arm in fixed relation to the probe assembly.

In one embodiment the calibration surface defines a plane. In another embodiment, the calibration surface defines a curve. In yet another embodiment, the calibration surface includes a plurality of planar steps. In still another embodiment, the calibration surface defines a frustoconical surface. In another embodiment, the calibration surface includes a plurality of concave surfaces. In yet another embodiment, the calibration surface includes at least one sphere. In a preferred embodiment, the calibration surface includes three spheres. Each sphere lies in a plane. The axes of the spheres define apexes of a substantially equilateral triangle.

In another aspect of the invention, a method of calibrating a probe assembly of a measuring machine is disclosed. The measuring machine has a frame and a movable arm mounted to the frame. The probe assembly is fixed to the movable arm and includes a probe tip. The method includes the steps of coupling a calibration object to the movable arm in fixed relation to the probe assembly; probing the calibration object with the probe tip to obtain a measurement; comparing the measurement to a stored measurement; and, calibrating the probe assembly based on the comparison.

In another aspect of the invention, the method further includes the steps of sensing an operating condition; comparing the operating condition to a predetermined threshold; and, determining whether to enter a recalibration mode based on the comparison.

In one embodiment, the sensing step includes the step of sensing at least one of temperature, humidity or time. In another embodiment, the sensing step includes the steps of determining a difference between a probed measurement and a desired measurement, thereby defining a discrepancy, and comparing the discrepancy to a first predetermined threshold. In yet another embodiment, the number of discrepancies is accumulated and is compared to a second predetermined threshold.

In yet another aspect of the invention, the method further includes the step of of determining whether the machine required recalibration. In still another aspect of the invention, the method further includes the step of indicating whether the machine required recalibration. In another aspect of the invention, the method further includes the step of adjusting the predetermined threshold.

In still another aspect of the invention, a coordinate measuring machine is disclosed. The machine includes a frame defining a measurement volume, a movable member movably attached to said frame, and a probe assembly, having a probe tip, attached to the movable member for probing measurements of a workpiece placed in the measurement volume. A calibration object is detachably secured to the movable member to move therewith in fixed relation to the probe assembly. The calibration object defines a surface having a predetermined geometric form. The probe assembly is adapted to articulate relative to the movable member about at least two axes such that the surface of the calibration object may be probed by the probe tip. The machine further includes a computer for causing the machine to enter a recalibration mode based a comparison between a sensed condition and a predetermined threshold and further causing the probe assembly to articulate.

In one embodiment, the calibration surface lies in a plane substantially perpendicular to a longitudinal axis of the movable member. In another embodiment the calibration surface lies in a plane substantially parallel to a longitudinal axis of the movable member. In yet another embodiment, the calibration surface lies in a plane inclined at an angle relative to a longitudinal axis of said movable member.

Various embodiments of the present invention provide certain advantages and overcome certain drawbacks of the conventional techniques. Not all embodiments of the invention share the same advantages and those that do may not share them under all circumstances. This being said, the present invention provides numerous advantages including the noted advantage of reduced time required to perform a calibration procedure.

Further features and advantages of the present invention as well as the structure and operation of various embodiments of the present invention are described in detail below with reference to the accompanying drawings.

BRIEF DESCRIPTION OF THE DRAWINGS

The invention will now be described by way of example, with reference to the accompanying drawings, in which:

FIGS. 3b–3e are side views of alternative probe assemblies of FIG. 3a;

DETAILED DESCRIPTION

Figure 1:
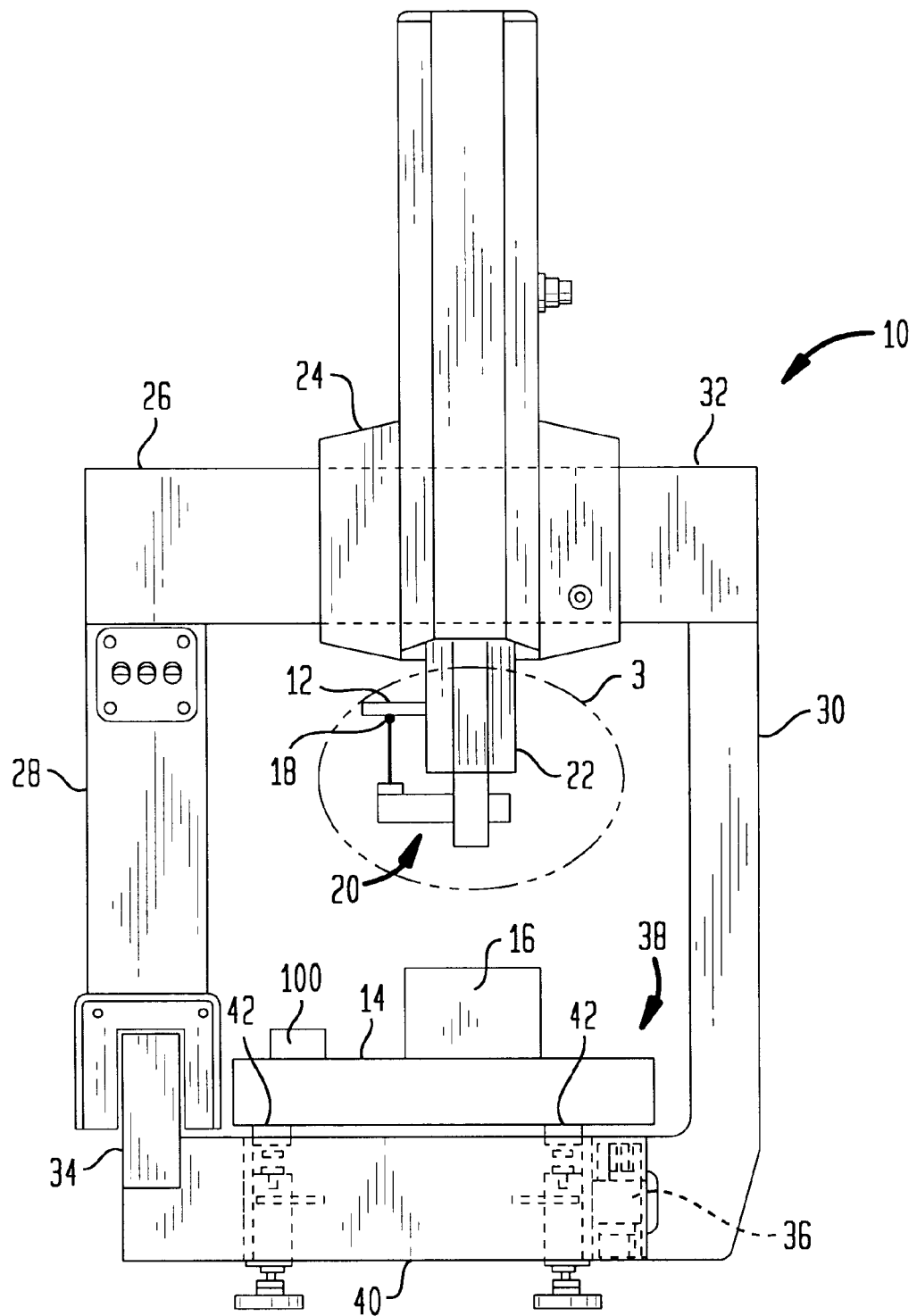
FIG. 1 is a side view of a bridge-type coordinate measuring machine suitable for implementing the calibration apparatus and method of the present invention.

FIG. 1 is a side view of a coordinate measuring machine 10 suitable for incorporation of the calibration object 12 (shown schematically in FIG. 1) for use in the calibration of the machine 10 according to the present invention. A worktable 14 supports a workpiece 16 to be measured. A probe tip 18 of a movable probe assembly 20 is brought into contact with points on the surface of the workpiece 16 and the coordinate of each point is measured and recorded by the machine, as is well known to those skilled in the art. However, as shown in FIG. 1, probe assembly 20 is in a calibration position, as will become apparent hereinafter.

The probe assembly 20 is carried by and fixed to a component of the machine 10, such as a ram 22, which is movable vertically in the z axis through bearings in a carriage 24. The carriage 24 is movable horizontally in the x axis along guideways on an x-rail 26. The x-rail 26 is carried by vertical support members 28 and 30, which, together with x-rail 26, form a bridge 32, which is movable in the y axis along y-rails 34 and 36.

A base assembly 38 includes a base 40, the worktable 14 and support means 42 for coupling the worktable 14 to the base 40. The bridge 32 is supported by the base 40. Although FIG. 1 depicts a bridge-type coordinate measuring machine, it is to be understood that a horizontal-type or other probe-based coordinate measuring machine may be used in conjunction with the present invention. Thus, as used herein, component or ram shall mean any movable member of a coordinate measuring machine on which a probe assembly is attached.

Figure 2:
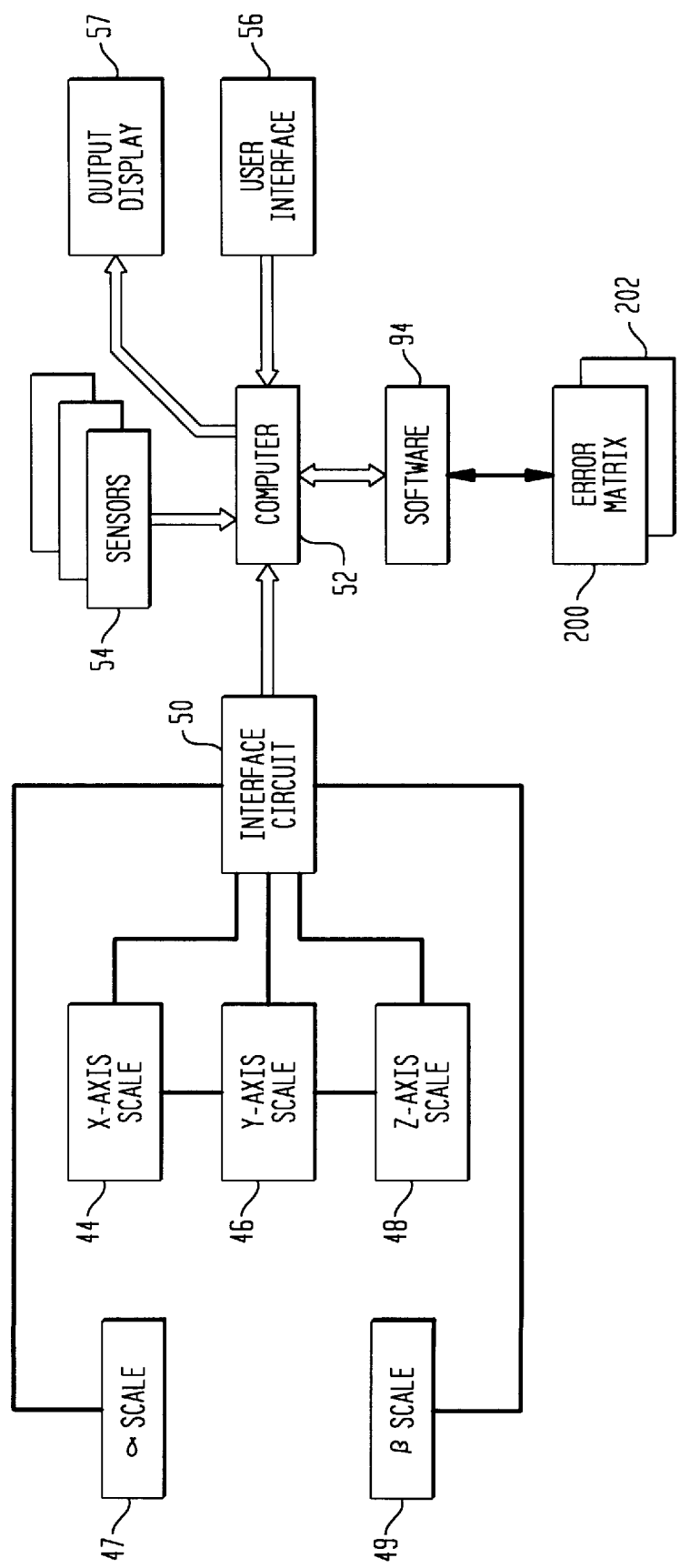
FIG. 2 is a block diagram of the coordinate measuring machine illustrated in FIG. 1.

FIG. 2 is a block diagram of the machine 10. Scales 44, 46, 48 sense movement by probe tip 18 in the x, y and z directions, respectively, so that the probe coordinates can be continuously monitored. In addition, α scale 47 and β scale 49 (described below with reference to FIGS. 3a–3d) sense rotation of probe assembly 20 about the z axis and the x-axis, respectively. The probe assembly may also rotate about the y-axis. Thus, although the coordinate measuring machine 10 shown in FIG. 1 is a 5-axis machine, a 6-axis machine may be used with the present invention. The scale output signals are provided through interface circuitry 50 to a computer 52, such as an Intel microprocessor. Typically, in the measurement of a workpiece 16, the probe tip 18 is brought into contact with a plurality of points on the workpiece surface, and the coordinates of each point are sensed by the scales 44, 46, 47, 48, and 49 and recorded by the computer 52.

Errors are introduced into the scale readings by inaccuracies in the scale systems and by imperfections in the guideways along which each machine element travels etc. Each machine element is subject to errors having six components as it travels in a prescribed direction. The six error components are described with reference to movement of the bridge 32 in the y direction. Six error components are also associated with the movement of a carriage 24 in the x direction and with movement of the ram 22 in the z direction. The first error component is a displacement error Dy along the direction of movement, in the y direction. X direction and z direction displacement errors, Dx and Dz, are commonly known as straightness errors since they are commonly caused by guideways which are not perfectly straight. The remaining error components are rotational. Rotation of the bridge 32 about the y axis is commonly known as roll Ay. Rotations of the bridge 32 about the x and z axes are commonly known as pitch Ax and yaw Az, respectively. A complete characterization of the machine with parametric errors requires measurement of the six error components at selected locations along each direction of movement, resulting in an error matrix 200 having 18 columns. The total error at an arbitrary point in the measurement volume is calculated from the parametric errors.

Factory calibration of the coordinate measuring machine 10 starts by moving the ram 22 to a start position and locking the ram 22 and the carriage 24 to their guideways. The bridge 32 is then moved in the y direction to selected calibration positions. For each position, the outputs of the probe assembly and the scales are read by computer 52. These outputs are then processed to determine y axis parametric errors.

For z axis error measurements, the bridge 32 and the carriage 24 are locked in their guideways. The ram 22 is moved in the z direction to selected calibration positions. The z axis parametric errors are determined in a manner similar to the measurement of the y axis errors described above.

For x axis error measurement, the bridge 32 and the ram 22 are locked to their guideways, and the carriage 24 is moved in the x direction to selected calibration positions. The x axis parametric errors are determined in a similar manner to the measurement of y axis errors as described above.

Computer 52 processes the error matrix to a standard form and stores it in memory which may be a computer disk or to other known memory devices. When the coordinate measuring machine is used to measure workpieces, the computer loads the error matrix from the memory. When coordinates of a point on the workpiece are measured, the machine retrieves the corresponding parametric errors from the matrix are retrieved, the x, y and z errors are calculated and subtracted as corrections.

"Workpiece surface" as used herein can refer to any external or internal surface of a workpiece accessible by the probe tip 18. For example, coordinate measuring machines are commonly used to measure the inside dimensions of various holes in machined parts. Coordinate measuring machines conventionally have the capability of measuring the coordinates of individual points on the workpiece surface and also of providing the definitions of various geometric surfaces of the workpiece. For example, a plane surface can be defined by a vector normal to the plane and the x, y, z coordinates of the point of intersection between the normal vector and the plane. Similarly, a circle or a sphere can be defined by the coordinates of the center point and the radial dimension, while a cylindrical surface can be defined by the coordinates of the center axis and the radial dimension. Further, a coordinate measuring machine may define the coordinates of a workpiece by degrees and radians.

Figure 3A:
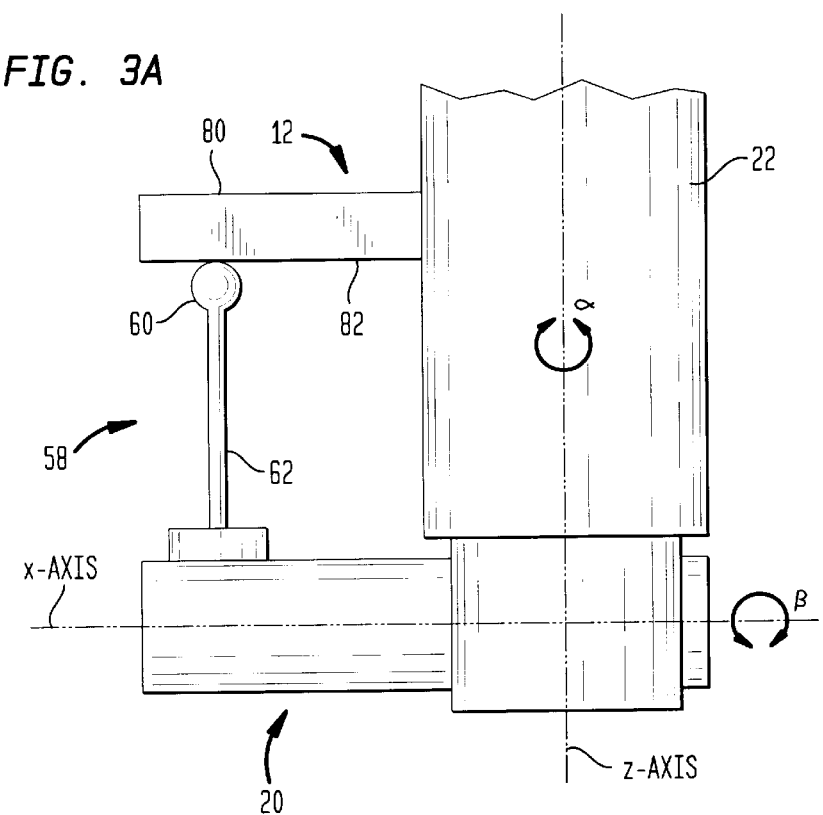
FIG. 3a is an enlarged view of the probe assembly and one embodiment of the calibration object of the present invention encircled by line 3 of FIG. 1.
Figure 3C:
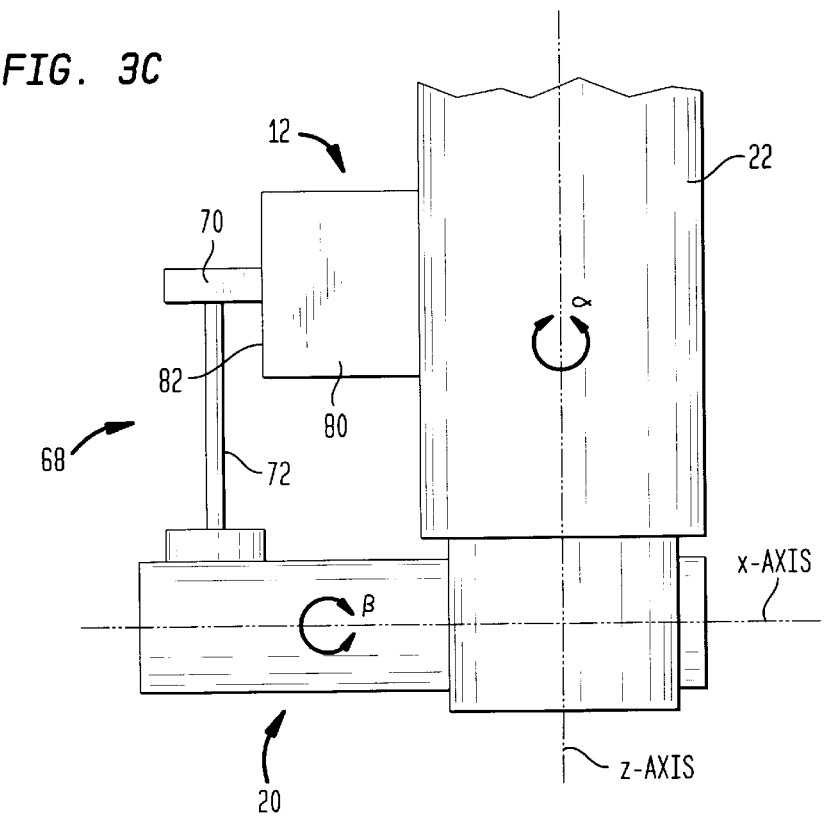
Figure 3B:
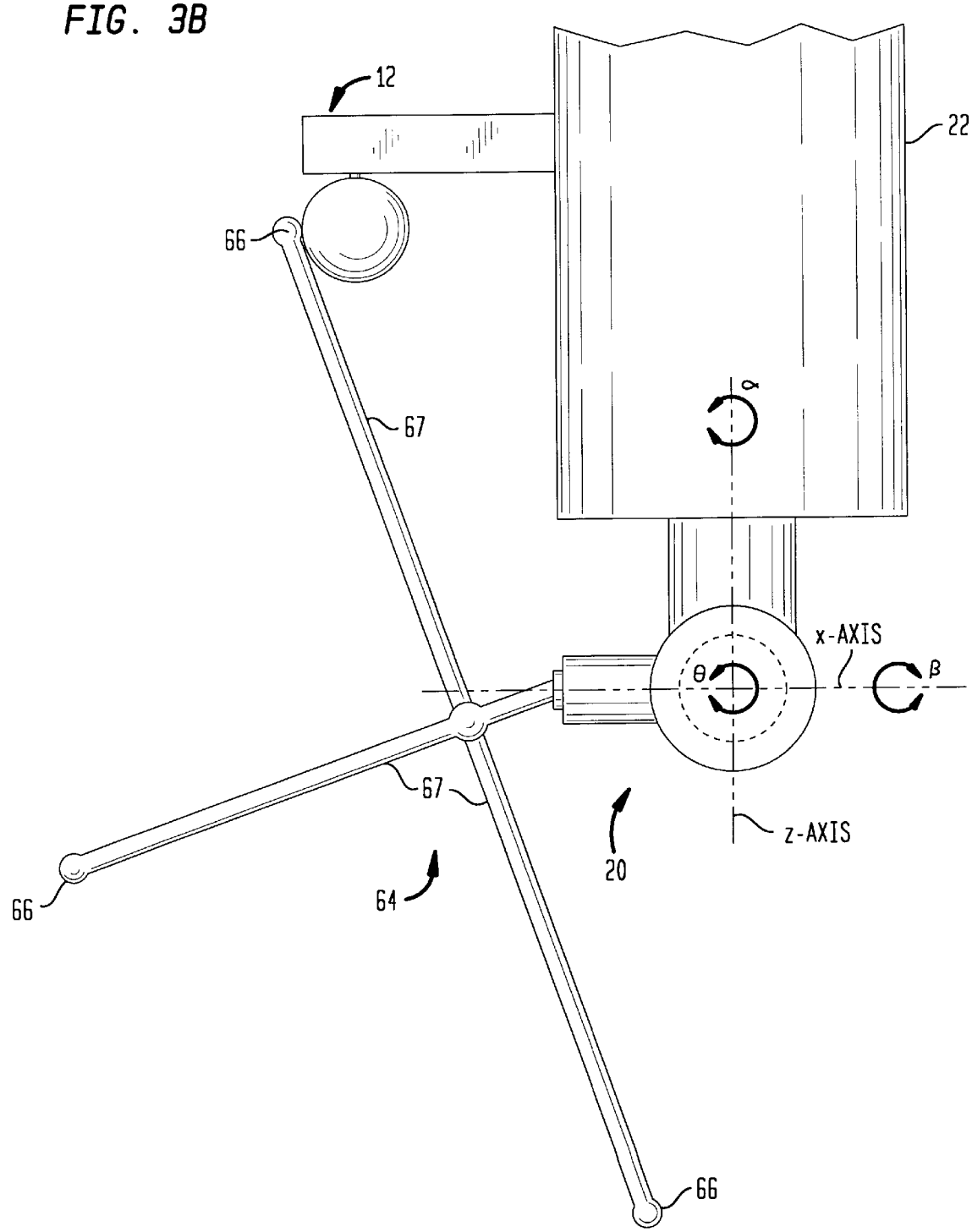
Figure 3D:
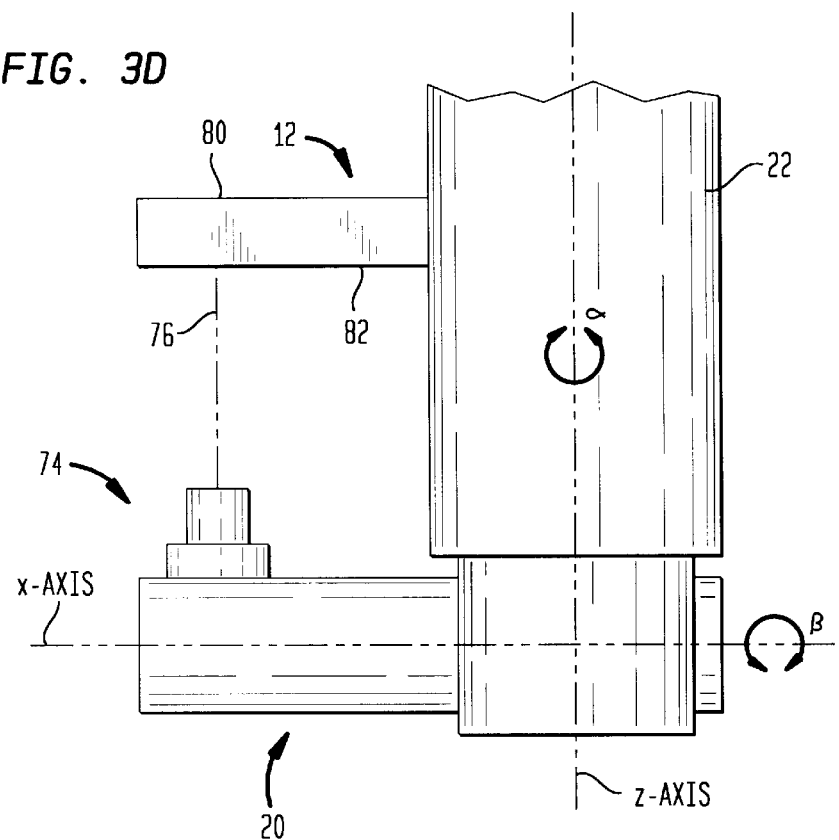
Figure 3E:
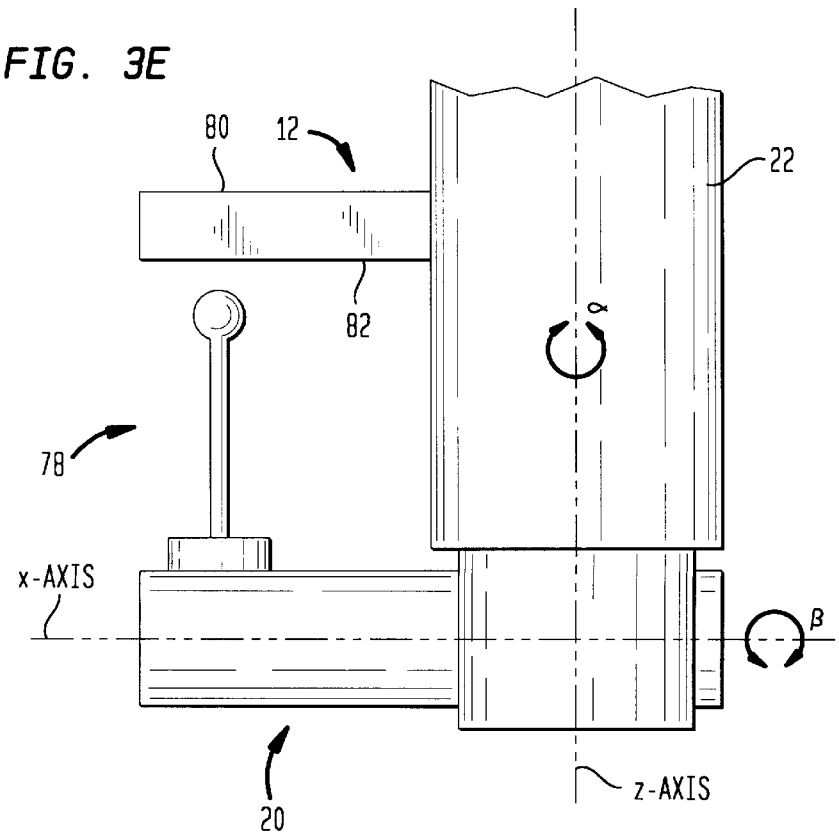

The probe tip 18 can be of the type which senses a workpiece at each point and provides a signal to activate the measuring circuitry. Alternatively, separate manual means, such as a push-button switch provided in user interface 56 may activate the measuring circuitry when the probe tip 18 is to sense the workpiece 16. Further, those skilled in the art will recognize in view of this disclosure that probe tip 18 may be any contacting or non-contacting probe. Examples of contacting type probes include a ruby ball stylus 58 having a highly visible, highly spherical industrial ruby ball 60 drilled and bonded onto a stainless steel stem 62, as depicted in FIG. 3a; a star stylus 64 having four or five ruby balls 66 (only three of which are shown) mounted on stainless steel stems 67, as depicted in FIG. 3b; or a disc stylus 68 having a cylindrical disc 70 mounted on a stainless steel stem 72, as depicted in FIG. 3c. It should be noted that the star stylus 64 shown in FIG. 3b may also rotate through an angle θ about the y-axis, shown extending into the plane of FIG. 3b. Accordingly, a θ-scale (not shown) may be utilized. Examples of non-contacting type probes include a laser probe 74 that emits light beam 76, depicted in FIG. 3d; or a capacitance type probe 78, depicted in FIG. 3e. In addition, those skilled in the art will recognize in view of this disclosure that the coordinate measuring machine of the present invention may select from a variety of the above and other probes stored on a turret for measuring selected features of the workpiece. In each case, the specific calibration object chosen must be able to be probed by the chosen probe tip. Thus, if a laser probe is used, for example, the calibration object must be able to reflect the lights in a desired direction.

As previously stated the accuracy of conventional coordinate measuring machine is limited by the inaccuracies in the calibration of its measuring probe. Rather than recalibrate the probe using a calibration object fixed in the measurement volume of the measuring machine, the present invention provides a calibration object fixed relative to the probe assembly by attaching the calibration object to the movable member of the measuring machine. This has the advantage of allowing for recalibration of the probe assembly without the need to return to a fixed location on the work table. Thus, the calibration object is accessible to the tip of the probe thereby providing for the immediate performance of recalibration procedures.

In one illustrative embodiment, computer 52 receives signals from sensors 54, which sense various operating conditions, such as, but not limited to, temperature (both spatial and temporal), humidity, time, and other operating conditions suggested by this disclosure. Also, computer 52 may have a user interface 56 for accepting various user inputs and output display 57 for displaying various outputs to a user. As best shown in FIG. 3a, a calibration object 12 having a body 80 is detachably secured to the movable member 22 so that the calibration object 12 remains in a fixed relation to the probe assembly 20. The body 80 of the calibration object 12 includes a surface 82 having a predetermined geometric form which is adapted to be probed by the probe tip 18. That is, a particular selected probe tip must correspond to a certain geometric form. Alternatively, the selected geometric form may correspond to the desired accuracy to which the workpiece is to be measured.

In the example shown in FIG. 3a, the surface 82, when the calibration object 12 is attached to the movable member 22, lies in a plane substantially perpendicular to the z-axis of the movable member 22, thereby allowing the probe tip 18, in this case ball stylus 58, to probe the surface 82. Alternatively, when using a disc stylus 68, as shown in FIG. 3c, the surface 82 may lie substantially parallel to the longitudinal z-axis of movable member 22 to facilitate probing of the surface 82.

Figure 4A:
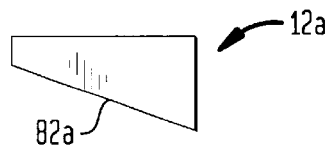
FIGS. 4a–4h are views of alternative embodiments of a calibration object according to the present invention; and, FIGS. 5 and 6 are flowcharts showing operation of one embodiment of the present invention.
Figure 4B:
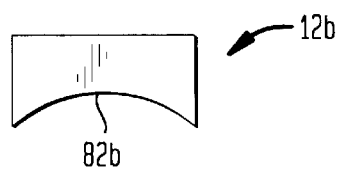
Figure 4C:
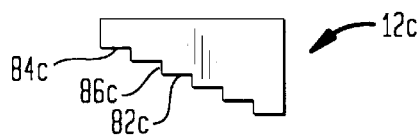
Figure 4D:
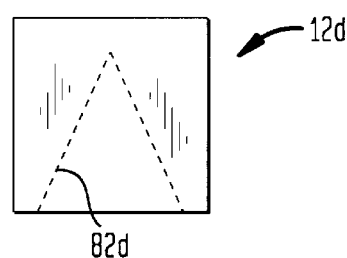
Figure 4E:
Figure 4F:
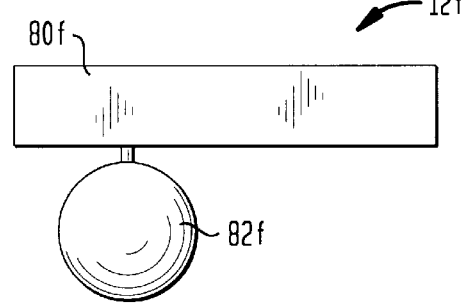
Figure 4G:
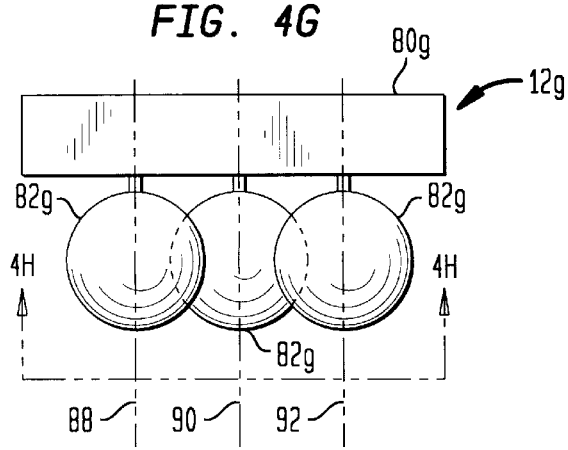
Figure 4H:
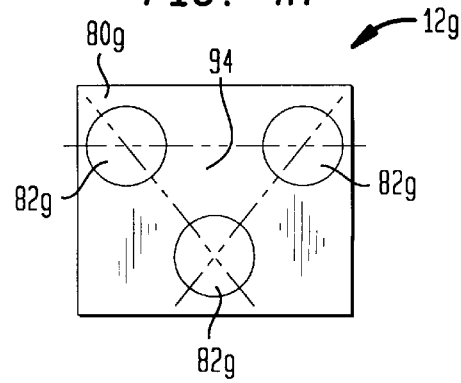

As previously mentioned, the calibration object may include a surface of any desired geometric form. Accordingly, as shown in FIG. 4a, calibration object 12a includes surface 82a, which, when the calibration object 12 is attached to movable member 22, surface 82a lies in a plane at an angle relative to the longitudinal z-axis of movable member 22. FIG. 4b represents another embodiment of calibration object 12, in which calibration object 12a includes a curved surface 82b. Calibration object 12c, as shown in FIG. 4c includes a plurality of steps 82c. When attached to the movable member 22, a landing 84c of each step lies in a plane substantially perpendicular to the z-axis of the movable member 22 and a riser 86c of each step lies in a plane substantially parallel to the longitudinal axis of the movable member 22. Calibration object 12d, shown in FIG. 4d, includes a frustoconical surface 82d. In this example, frustoconical surface 82d is formed internal to body 80. However, although not shown, the frustoconical surface 82d may be formed as an external surface extending from the body 80. In yet another alternative embodiment, as shown in FIG. 4e, the calibration object 12e includes a plurality of concave surfaces 82e, which may be formed on an inclined plane, thereby defining concave steps. The plane lies at an angle relative to the longitudinal axis of movable member 22 when the calibration object 12e is attached thereon. Calibration object 12f, shown in FIG. 4f, includes at least one sphere extending from the body 80f. Calibration object 12g, shown in FIGS. 4g and 4h, may include a plurality of spheres 82g extending from body 80g. The spheres 82g lie in a plane and have axes 88, 90, 92 that, as shown in FIG. 4e (which is a view taken along line 4h—4h of FIG. 4g), define the apexes of a substantially equilateral triangle 94. While a number of alternative embodiments for calibration object 12 have been described with reference to FIGS. 4a–4g, it is to be appreciated that these and other alternative configurations for calibration object 12 may be utilized in the present invention according to the selected probe tip and/or a desired precision for coordinate measuring machine 10.

As previously mentioned, a computer 52 may interface with the coordinate measuring machine 10, and, in particular, to the probe assembly 20. The computer 52, through associated software 94, may direct probe assembly 20 to cause probe tip 18 to probe the calibration object 12. Alternatively, a user may manually manipulate probe assembly 20 to cause probe tip 18 to probe the calibration object 12. Thus, whether the procedure for calibrating the probe assembly 20 and probe tip 18 is performed by the computer 52 and software 94 or performed manually, the steps outlined in FIGS. 5 and 6 illustrate an example of such a procedure.

Figure 5:
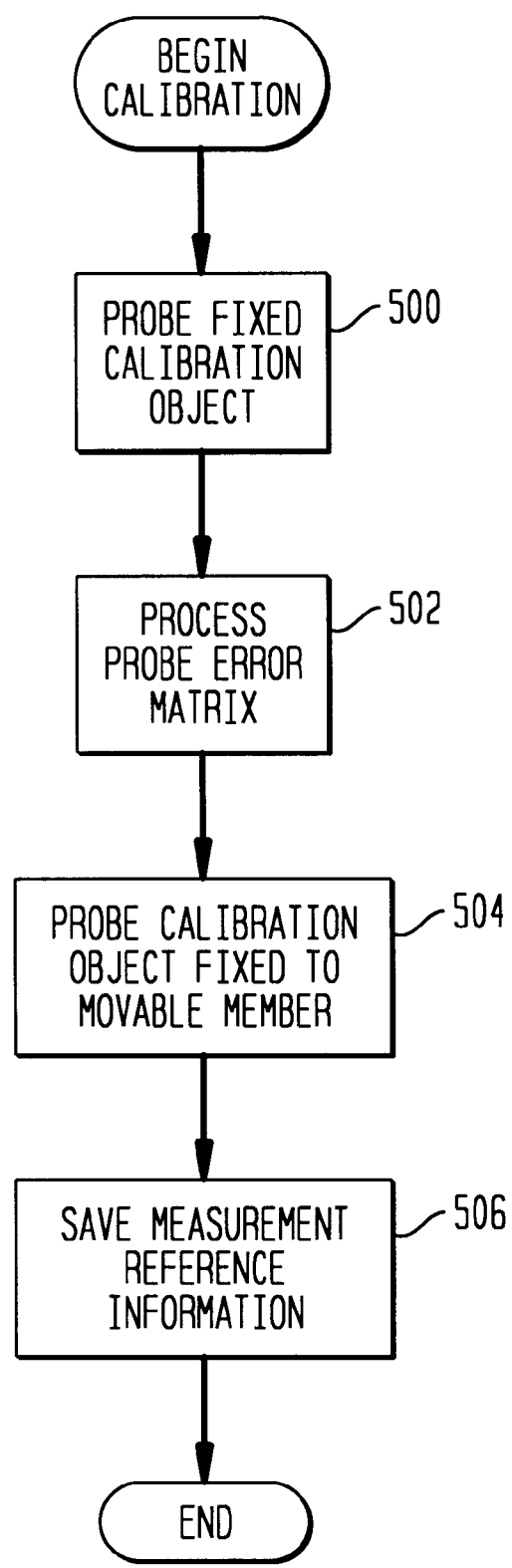

To calibrate the coordinate machine 10 together with the probe assembly 20 attached thereon, the calibration procedure shown in FIG. 5 is initiated. At step 500, the probe tip 18 of probe assembly 20 probes a fixed calibration object 100, which is mounted to the worktable in the measurement volume. At step 502, the computer 52, through software 94, processes a probe error matrix 202. It is to be understood that the parametric errors of probe error matrix 202 may be a function of the type of probe utilized.

Continuing with reference to FIG. 5, at step 504, after processing the probe error matrix 202 and before probing a workpiece, the probe assembly 20 articulates into a position such that the probe tip 18 may probe the calibration object 12. Next, at step 506, the computer 52, together with software 94, receives measurement information attained when probing the calibration object 12 fixed relative to the probe assembly and stores the measurement information in memory as reference measurement information.

Figure 6:
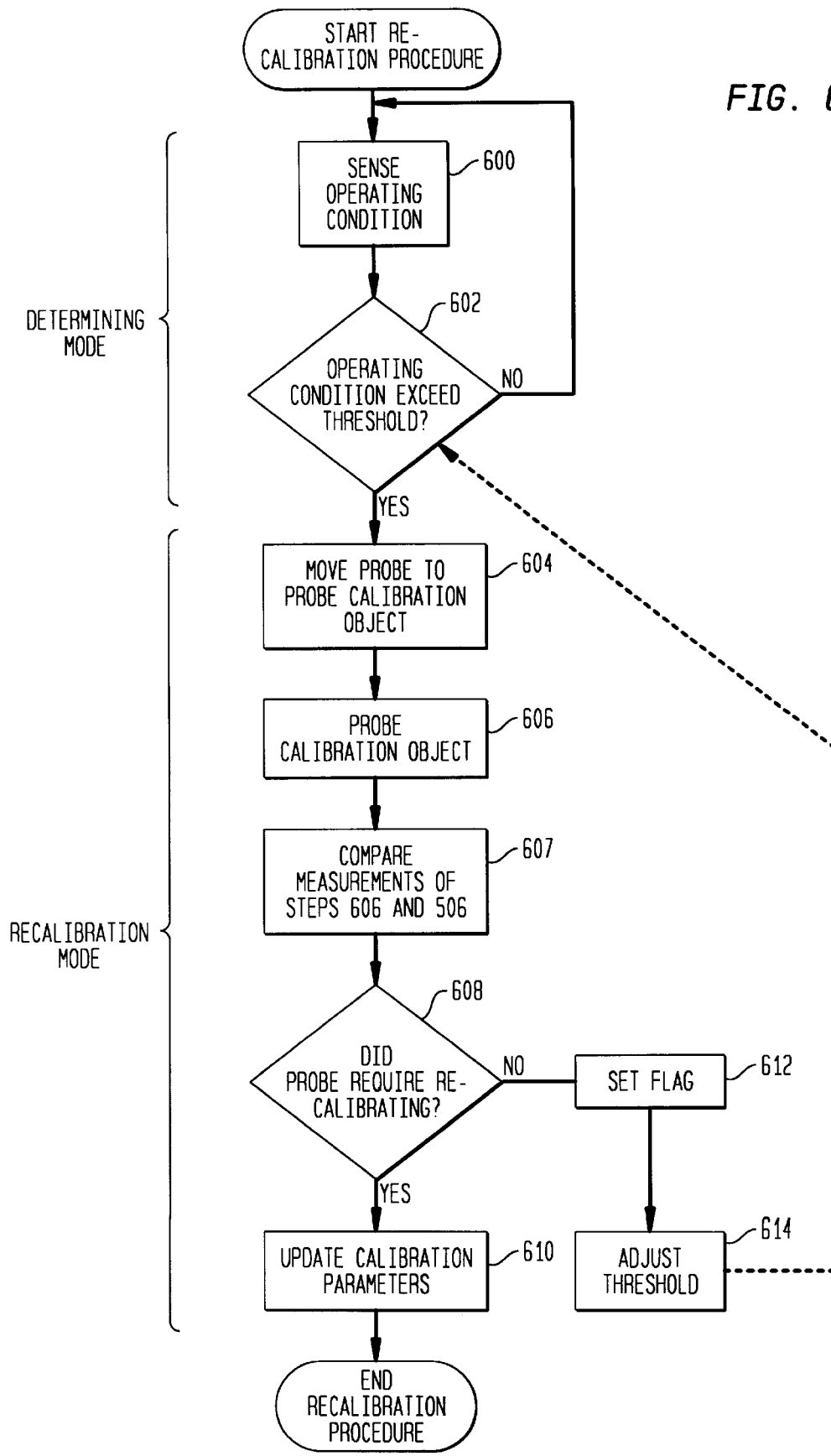

Once the initial calibration parameters are set with respect to the probe assembly 20, the recalibration process depicted in FIG. 6 begins. This recalibration procedure is continually operating in the background as the coordinate measuring machine measures particular points on the workpiece. More specifically, the recalibration procedure begins with a determining mode to determine when to recalibrate the probe assembly only. That is, the entire measuring machine is not recalibrated. Thus, beginning at step 600, in the determining mode, the computer 52 senses one or more operating conditions which may affect calibration of the probe from sensors 54. Examples of such operating conditions include temperature, time or humidity. Another example of such a condition will be explained hereinafter. Once computer 52 senses an operating condition, at step 602, the computer 52 compares the operating condition to a predetermined threshold. Once this comparison is made, the computer 52 determines whether to enter a calibration mode to calibrate the probe assembly. Thus, for example, if the ambient temperature exceeds a threshold value, computer 52 may determine that it is appropriate to calibrate the probe assembly. If the operating condition is such that it does not exceed a threshold value, then the computer 52 loops back to step 600 where it continues to sense operating conditions. As used herein, the term "exceed" shall mean greater than or less than, as desired. The specific operating condition sensed may be function of the regularity to which such a condition effects the calibration of the probe assembly. Thus, if it is known that in a particular situation that heat will likely cause the probe to drift out of calibration, then temperature may be sensed more often.

Continuing with reference to FIG. 6, if computer 52 determines that the probe assembly should be recalibrated, at step 604 the computer 52, through associated motors, such as stepper motors, solenoids and the like, causes the probe assembly to articulate so that the probe tip 18 may be in a position to probe the calibration object 12. Of course, the probe assembly may be manually articulated to be in a position such that the probe tip can probe the calibration object 12. As used herein, "articulate" shall mean to move along or about any axis to position the probe tip into a desired position. At step 606, the probe tip probes the calibration object 12. Next, at step 607, the computer 52 receives an actual measurement and compares this actual measurement to the stored reference measurement information obtained at step 506. Then at step 608, the computer 52 determines whether or not the probe assembly actually required recalibrating based on this comparison. If so, at step 610, the computer may indicate that the probe assembly requires recalibration. Also at step 610, the error matrix 202 containing the parametric errors attributable to the probe assembly is then updated with new parametric errors. However, if, at step 608, it is determined that recalibration was unnecessary, then, at step 612, the computer 52 indicates that no recalibration was required. At step 614, the computer 52 may then adjust the predetermined threshold value of step 602 such that, at the next determining mode, the computer 52 utilizes the adjusted threshold. Thus, as shown in FIG. 6, adaptive feedback control is utilized.

In an alternative embodiment according to the present invention, rather than base a decision to recalibrate on a comparison of factors such as temperature, humidity or time, the computer 52 may determine whether to recalibrate by determining a difference between a probed measurement and a desired measurement, thereby defining a discrepancy, and comparing the discrepancy to a predetermined threshold. That is, computer 52 determines whether the probed measurement is outside an anticipated tolerance. Thus, in this example, the sensed operating condition of step 600 is a determination of the difference between a probed measurement and a desired measurement thereby defining a discrepancy. At step 602, this discrepancy is compared to a predetermined threshold value. Further, rather than enter the recalibration mode immediately, the computer 52, at step 602, may accumulate a number of discrepancies and compare the accumulated number of discrepancies to another predetermined threshold value. Thus, rather than enter the recalibration mode based on a single discrepancy, a number of discrepancies must occur in order to enter the recalibration mode. Also, computer 52 may accumulate the number of times or the frequency with which the probe assembly was recalibrated. This information may be useful for maintenance or other purposes.

While the best mode for carrying out the invention has been described in detail, those skilled in the art to which this invention relates will recognize various alternative designs and embodiments, including those mentioned above, in practicing the invention that has been defined by the following claims.

What is claimed is:

1. A measuring machine comprising:
   a frame;
   a probe assembly movably coupled to said frame, said probe assembly having a probe tip; and,
   a calibration object coupled to said frame in fixed relation to said probe assembly to move therewith, with said calibration object being adapted to be probed by said probe tip for calibrating said probe assembly.

2. A measuring machine comprising:
   a frame defining a measurement volume;
   a movable member movably attached to said frame;
   a probe assembly attached to said movable member for probing measurements of a workpiece placed in said measurement volume, said probe assembly having a probe tip; and,
   a calibration object detachably secured to said movable member in fixed relation to said probe assembly, with said calibration object being adapted to be probed by said probe tip for calibrating said probe assembly.

3. A machine according to claim 2 wherein said probe assembly articulates relative to said movable member such that said calibration object may be probed by said probe tip.

4. A machine according to claim 3 wherein said probe assembly is adapted to rotate about at least one axis.

5. A machine according to claim 3 wherein said probe assembly is adapted to rotate about at least two axes.

6. A machine according to claim 2 wherein said calibration object defines a surface having a predetermined geometric form adapted to be probed by said probe tip.

7. A machine according to claim 6 wherein said surface lies in a plane substantially perpendicular to a longitudinal axis of said movable member.

8. A machine according to claim 6 wherein said surface lies in a plane substantially parallel to a longitudinal axis of said movable member.

9. A machine according to claim 6 wherein said surface lies in a plane inclined at an angle relative to a longitudinal axis of said movable member.

10. A machine according to claim 6 wherein said surface is curved.

11. A machine according to claim 6 wherein said surface includes a plurality of steps, with a landing of each said step lying in a plane substantially perpendicular to a longitudinal axis of said movable member and with a riser of each said step lying in a plane substantially parallel to said longitudinal axis of said movable member.

12. A machine according to claim 6 wherein said surface is a frustoconical surface.

13. A machine according to claim 6 wherein said surface includes a plurality of concave surfaces, with said concave surfaces lying in a plane inclined at an angle relative to a longitudinal axis of said movable member.

14. A machine according to claim 6 wherein said surface is includes at least one sphere.

15. A machine according to claim 6 wherein said surface includes three spheres, with said spheres lying in a plane and having axes that define apexes of a substantially equilateral triangle.

16. A machine according to claim 2 further comprising a computer, with said computer causing said machine to enter a recalibration mode based a sensed condition.

17. A machine according to claim 16 wherein said sensed condition is at least one of temperature, humidity and time.

18. A machine according to claim 16 wherein said sensed condition is based on a comparison of a discrepancy and a first predetermined threshold, with said discrepancy being defined as a difference between a probed measurement and a desired measurement.

19. A machine according to claim 18 wherein said sensed condition is further based on a comparison of an accumulation of said discrepancies and a second predetermined threshold.

20. A machine according to claim 3 further comprising a computer, with said computer causing said probe assembly to articulate.

21. A machine according to claim 2 wherein said probe assembly is one of a contacting and non-contacting type probe assembly.

22. A machine according to claim 2 further comprising a computer, with said computer causing said probe tip to probe said calibration object after probing a fixed calibration object and before probing the workpiece.

23. A machine according to claim 22 wherein said computer develops an error matrix corresponding to said calibration object.

24. A calibration surface for calibrating a probe assembly of a measuring machine, the probe assembly being mounted on a movable arm of the machine and having a probe tip, with said calibration surface being positioned on the movable arm in fixed relation to the probe assembly.

25. A calibration surface according to claim 24 wherein said surface defines a plane.

26. A calibration surface according to claim 24 wherein said surface defines a curve.

27. A calibration surface according to claim 24 wherein said surface includes a plurality of planar steps.

28. A calibration surface according to claim 24 wherein said surface defines a frustoconical surface.

29. A calibration surface according to claim 24 wherein said surface includes a plurality of concave surfaces.

30. A calibration surface according to claim 24 wherein said surface includes at least one sphere.

31. A calibration surface according to claim 24 wherein said surface includes three spheres, with said spheres lying in a plane and having axes that define apexes of a substantially equilateral triangle.

32. A method of calibrating a probe assembly of a measuring machine, the measuring machine having a frame, a movable arm mounted to the frame, and the probe assembly fixed to the movable arm, the probe assembly having a probe tip, with said method comprising the steps of:
   coupling a calibration object to the movable arm in fixed relation to the probe assembly;
   probing said calibration object with the probe tip, to obtain a measurement;
   comparing said measurement to a stored measurement; and,
   calibrating the probe assembly based on said comparison.

33. A method according to claim 32 wherein said probing step comprises the step of articulating the probe assembly into a position such that said probe tip may probe said calibration object.

34. A method according to claim 32 further comprising the steps of:
   sensing an operating condition;
   comparing said operating condition to a predetermined threshold; and,
   determining whether to enter a recalibration mode based on said comparison.

35. A method according to claim 34 further comprising the step of determining whether the machine required recalibration.

36. A method according to claim 35 further comprising the step of indicating whether the machine required recalibration.

37. A method according to claim 35 further comprising the step of adjusting said predetermined threshold.

38. A method according to claim 34 wherein said sensing step includes the step of sensing at least one of temperature, humidity and time.

39. A method according to claim 34 wherein said sensing step comprises the steps of:
   determining a difference between a probed measurement and a desired measurement, thereby defining a discrepancy; and,
   comparing said discrepancy to a first predetermined threshold.

40. A method according to claim 37 wherein said sensing step further comprises the step of:
   determining a difference between a probed measurement and a desired measurement, thereby defining a discrepancy;
   accumulating a number of said discrepancies; and,
   comparing said accumulated number of discrepancies to a second predetermined threshold.

41. A method according to claim 32 further comprising the steps of:
   probing a fixed calibration object; and,
   probing a workpiece, wherein said step of probing said calibration object occurs after probing said fixed calibration object and before probing the workpiece.

42. A coordinate measuring machine comprising:
   a frame defining a measurement volume;
   a movable member movably attached to said frame;
   a probe assembly attached to said movable member for probing measurements of a workpiece placed in said measurement volume, said probe assembly having a probe tip;
   a calibration object detachably secured to said movable member to move therewith and being in fixed relation to said probe assembly, with said calibration object defining a surface having a predetermined geometric form, with said probe assembly being adapted to articulate relative to said movable member about at least two axes such that said surface of said calibration object may be probed by said probe tip; and,
   a computer for causing said machine to enter a recalibration mode based a comparison between a sensed condition and a predetermined threshold and further causing said probe assembly to articulate.

43. A machine according to claim 42 wherein said surface lies in a plane substantially perpendicular to a longitudinal axis of said movable member.

44. A machine according to claim 42 wherein said surface lies in a plane substantially parallel to a longitudinal axis of said movable member.

45. A machine according to claim 42 wherein said surface lies in a plane inclined at an angle relative to a longitudinal axis of said movable member.

46. A machine according to claim 42 wherein said surface is curved.

47. A machine according to claim 42 wherein said surface includes a plurality of steps, with a landing of each said step lying in a plane substantially perpendicular to a longitudinal axis of said movable member and with a riser of each said step lying in a plane substantially parallel to said longitudinal axis of said movable member.

48. A machine according to claim 42 wherein said surface is a frustoconical surface.

49. A machine according to claim 42 wherein said surface includes a plurality of concave surfaces, with said concave surfaces lying in a plane inclined at an angle relative to a longitudinal axis of said movable member.

50. A machine according to claim 42 wherein said surface includes at least one sphere.

51. A machine according to claim 42 wherein said surface includes three spheres, with said spheres lying in a plane and having axes that define apexes of a substantially equilateral triangle.

52. A machine according to claim 42 wherein said sensed condition is at least one of temperature, humidity and time.

53. A machine according to claim 42 wherein said sensed condition is based on a comparison of a discrepancy and a first predetermined threshold, with said discrepancy being defined as a difference between a probed measurement and a desired measurement.

54. A machine according to claim 42 wherein said computer causes said probe tip to probe said calibration object after probing a fixed calibration object and before probing the workpiece.

55. A machine according to claim 42 wherein said sensed condition is based on a comparison of an accumulation of said discrepancies and a second predetermined threshold.

56. A machine according to claim 42 wherein said computer develops an error matrix corresponding to said calibration object.

* * * * *